Figure 1:
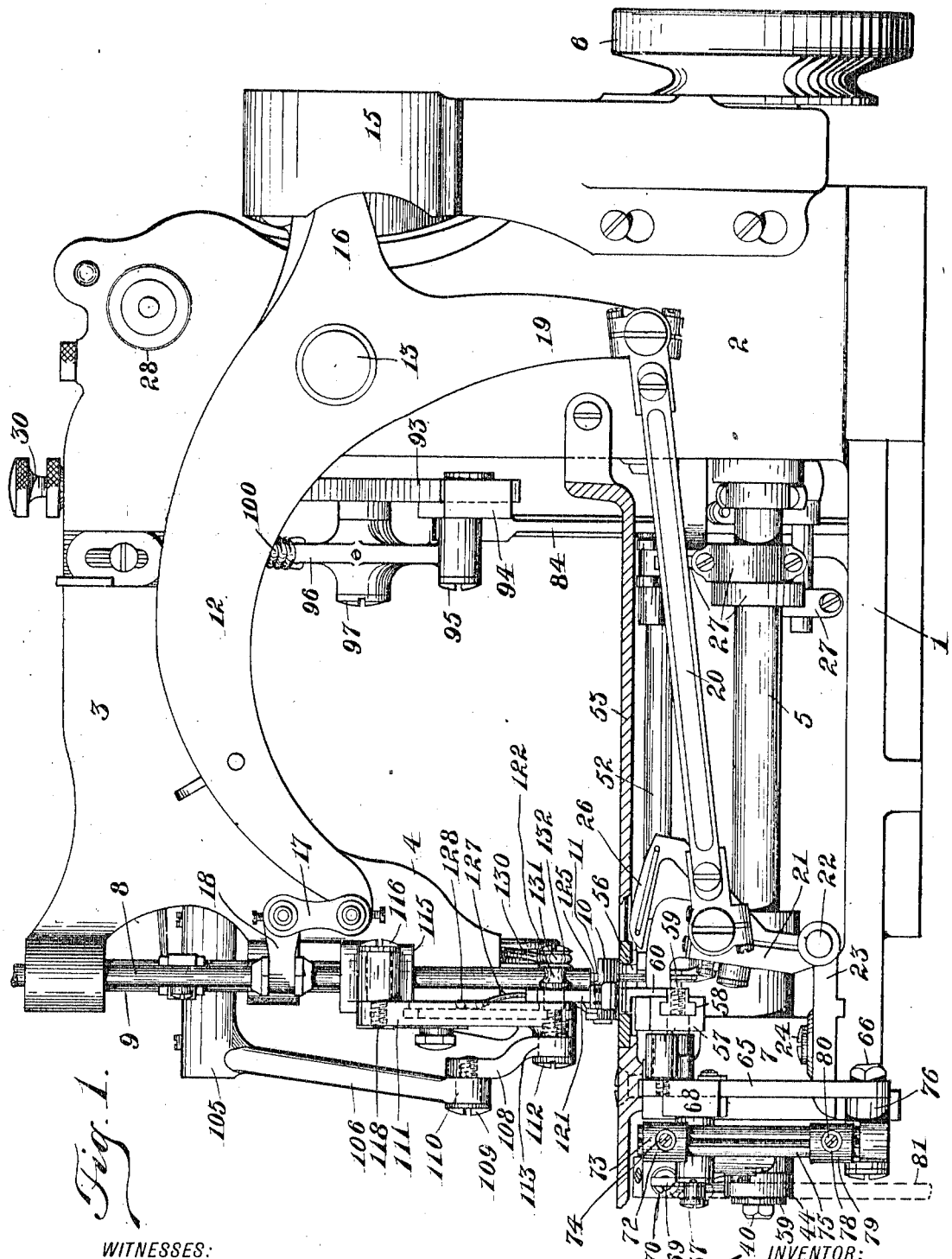

J. P. WEIS.
COMBINED RUFFLING AND FEEDING MECHANISM FOR SEWING MACHINES.
APPLICATION FILED AUG. 17, 1906.

1,118,321.

Patented Nov. 24, 1914.

6 SHEETS—SHEET 1.

WITNESSES:
Willis C. Robbins.
Louis Krug.

INVENTOR:
John P. Weis
BY Beach & Chapman
ATTORNEYS.

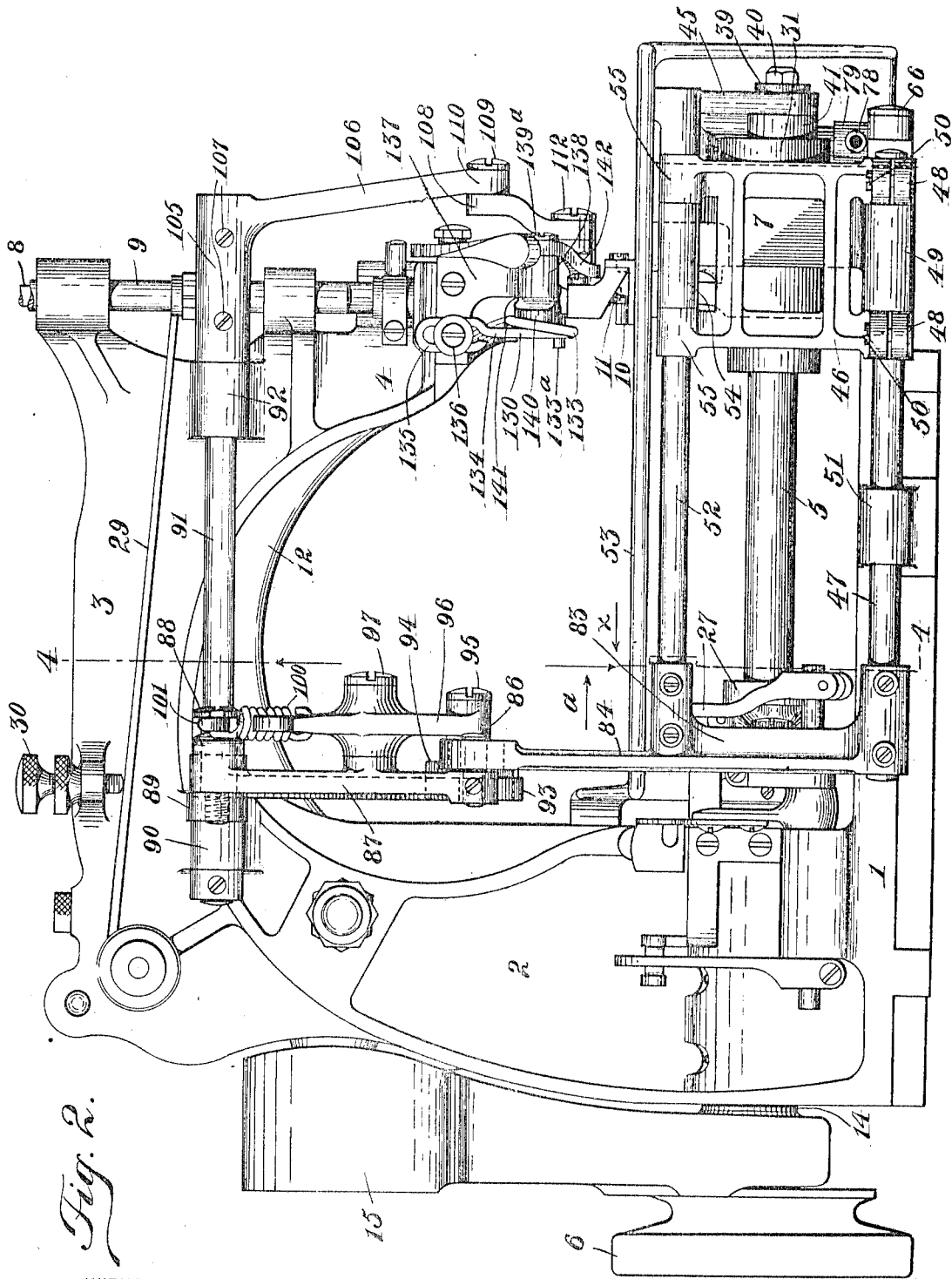

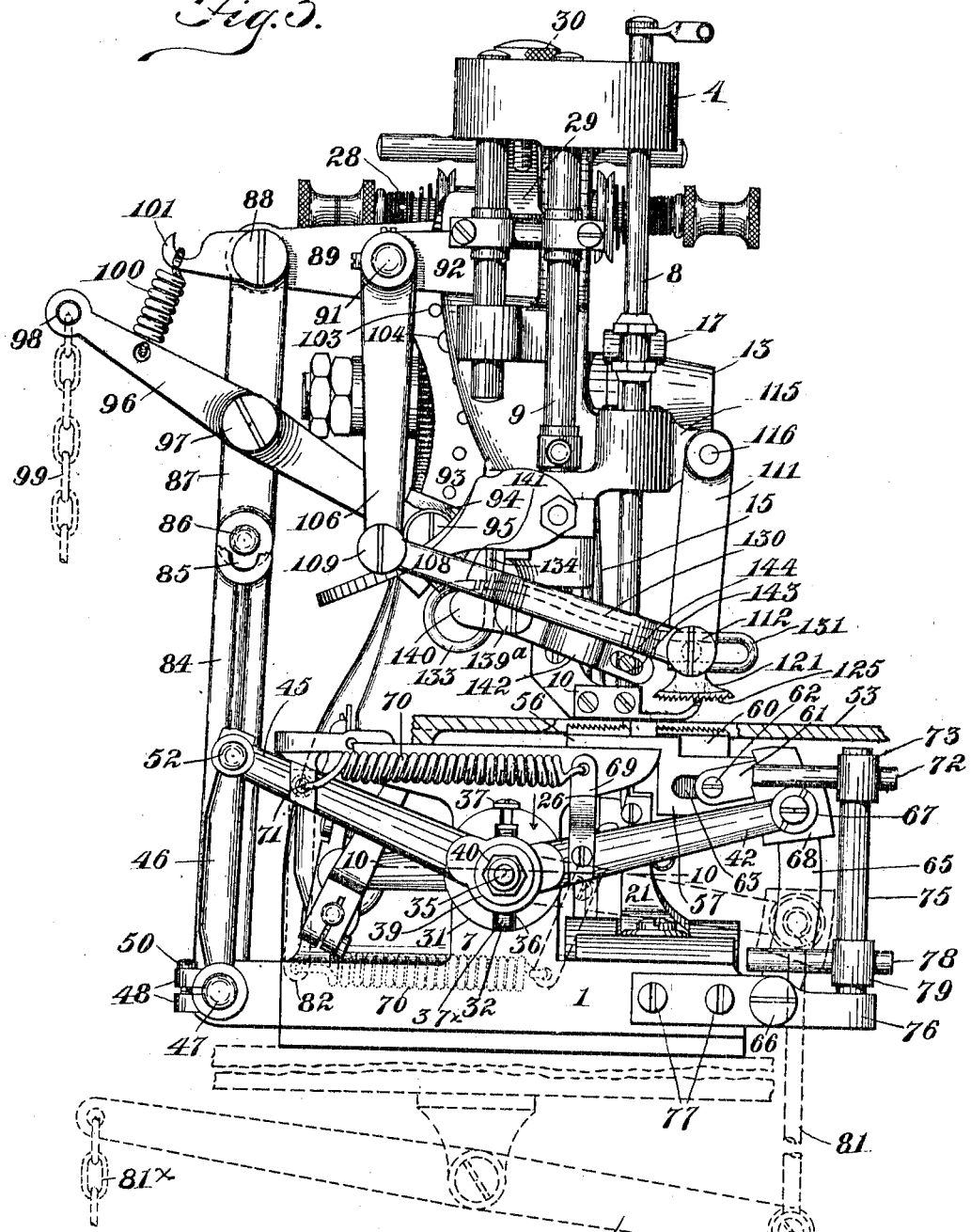

J. P. WEIS.
COMBINED RUFFLING AND FEEDING MECHANISM FOR SEWING MACHINES.
APPLICATION FILED AUG. 17, 1906.
1,118,321.
Patented Nov. 24, 1914.
6 SHEETS—SHEET 4.
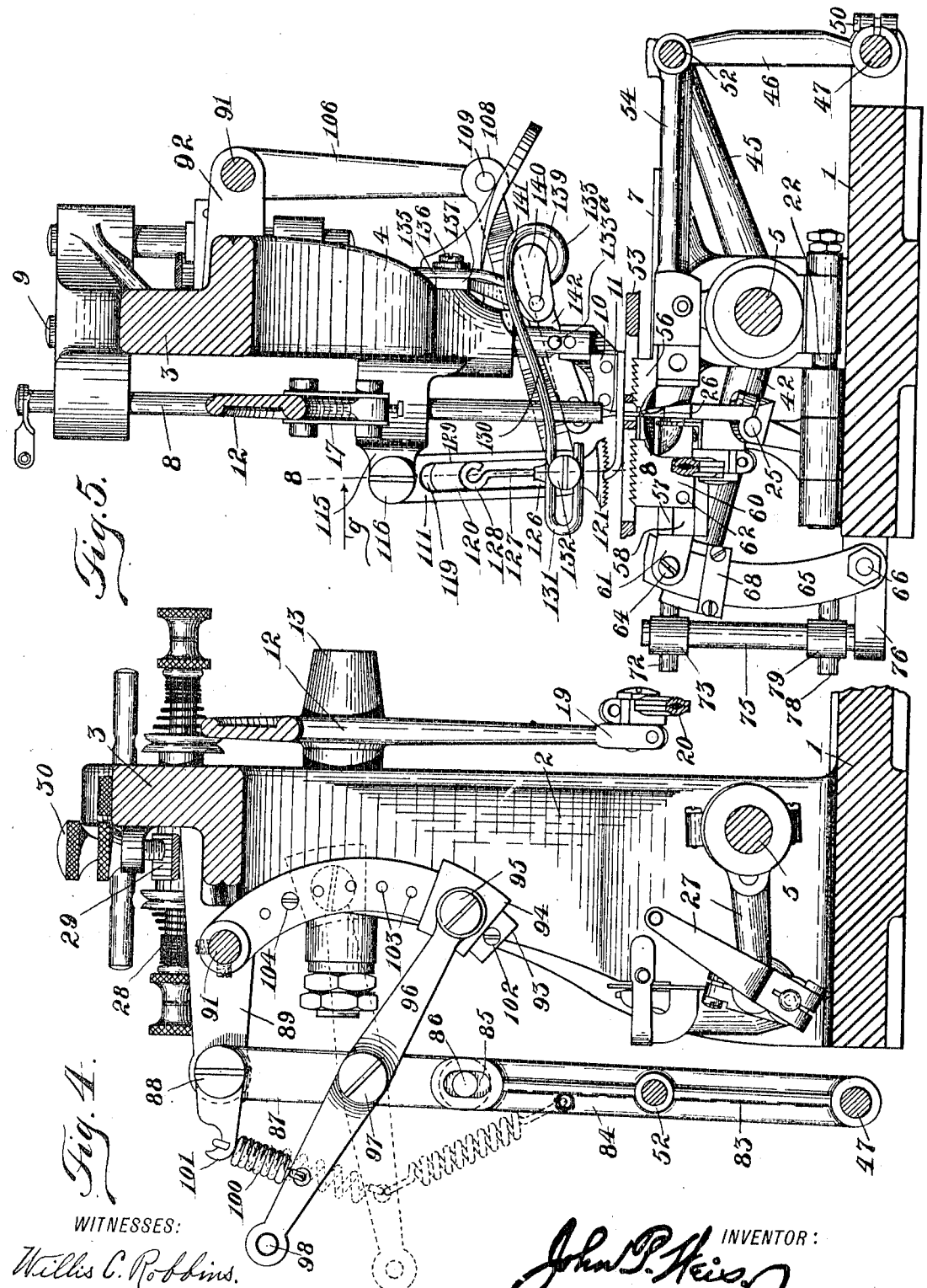
WITNESSES:
Willis C. Robbins.
Louis Krug.
INVENTOR:
John P. Weis
ATTORNEYS.

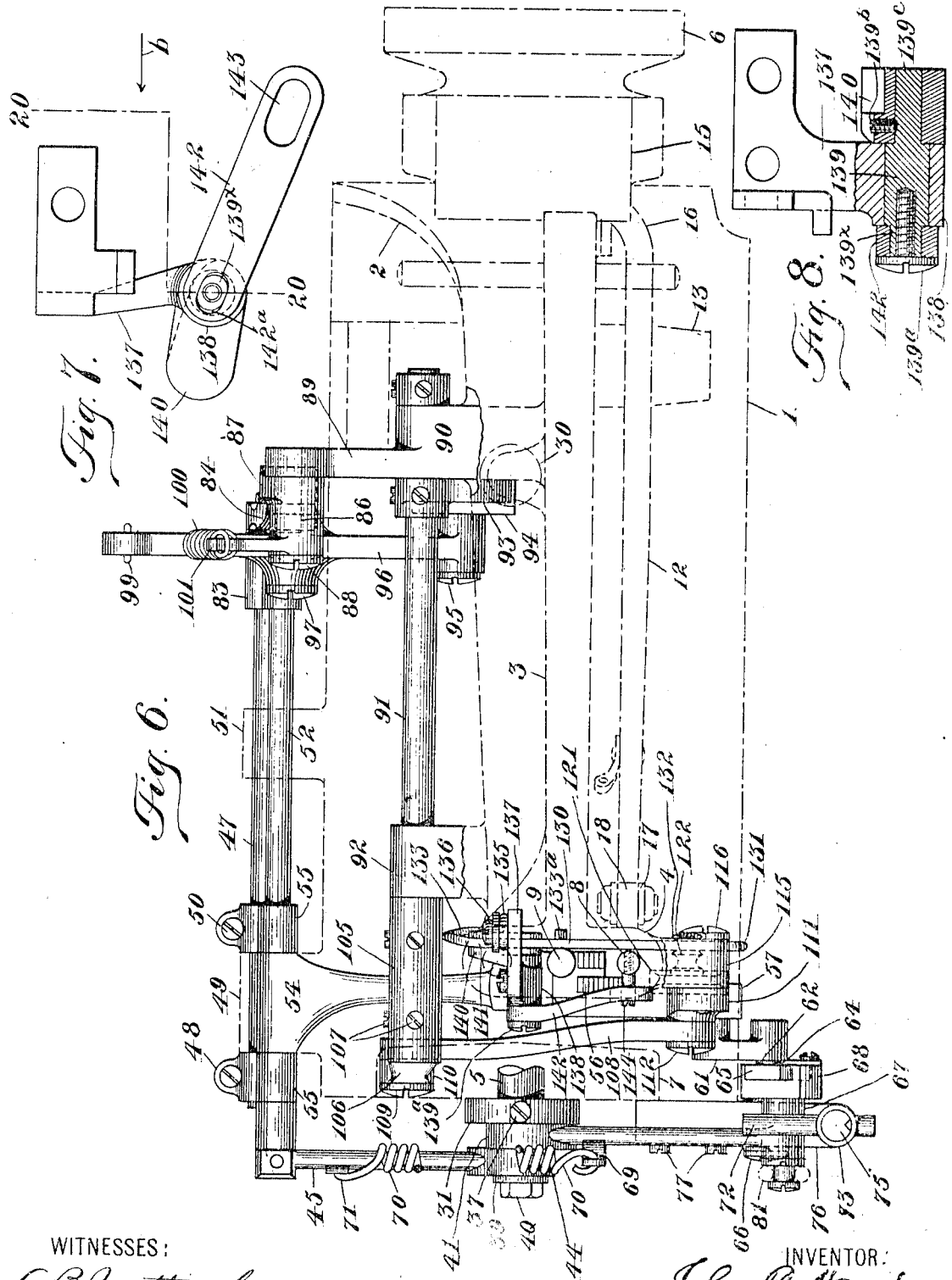

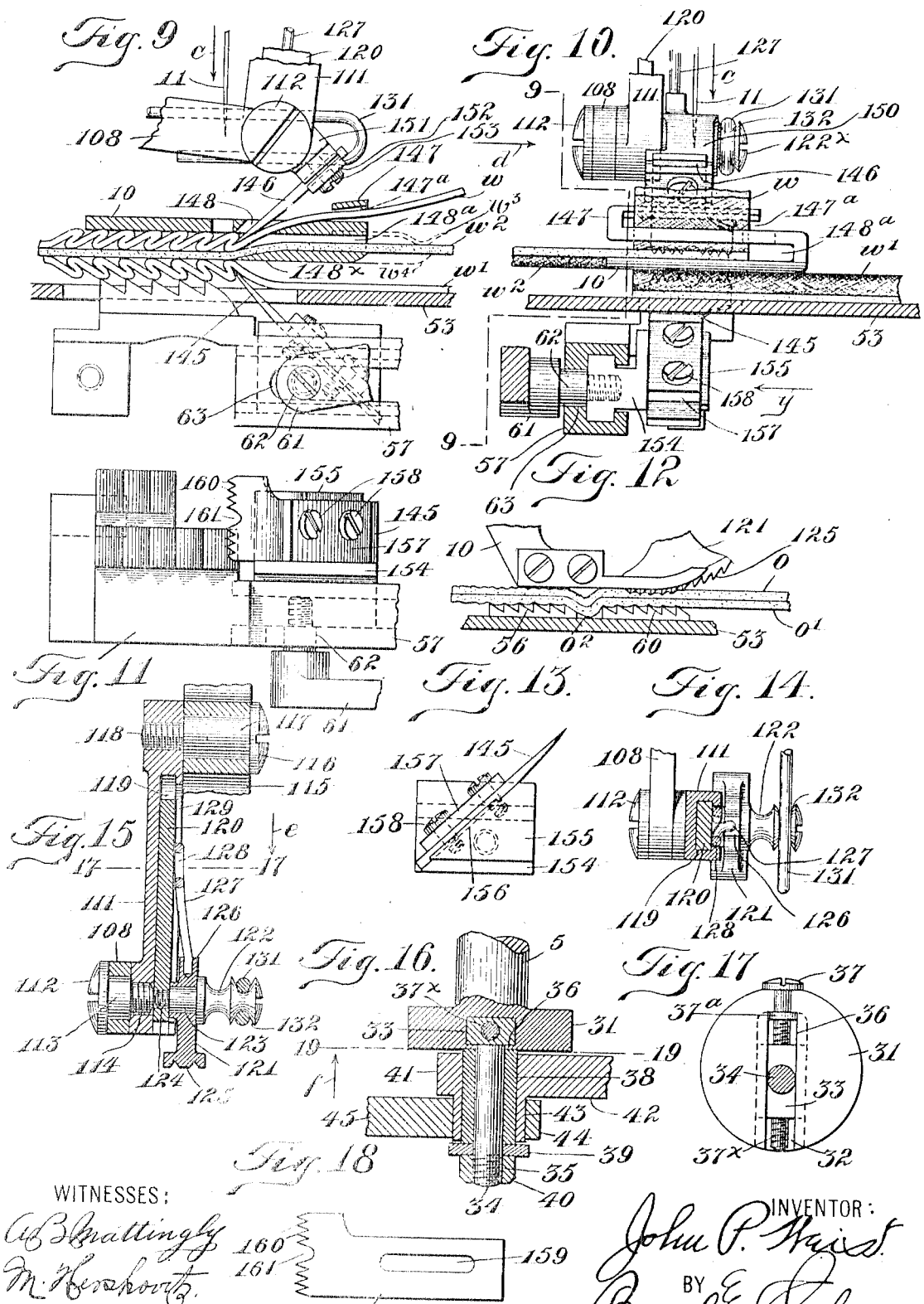

UNITED STATES PATENT OFFICE.

JOHN P. WEIS, OF NYACK, NEW YORK, ASSIGNOR TO METROPOLITAN SEWING MACHINE COMPANY, OF NEW YORK, N. Y., A CORPORATION OF NEW YORK.

COMBINED RUFFLING AND FEEDING MECHANISM FOR SEWING-MACHINES.

1,118,321.      Specification of Letters Patent.      Patented Nov. 24, 1914.

Application filed August 17, 1906. Serial No. 330,959.

*To all whom it may concern:*

Be it known that I, JOHN P. WEIS, a citizen of the United States, residing at Nyack, county of Rockland, and State of New York, have invented a new and useful Improvement in Combined Ruffling and Feeding Mechanism for Sewing-Machines, of which the following is a specification.

This invention relates to sewing machines and, particularly, to machines capable of stitching, ruffling and feeding simultaneously.

Among the objects of my invention may be noted the following: to provide a machine wherein ruffling and feeding may be done simultaneously; to provide a machine wherein a plurality of pieces of fabric may be passed through the machine and stitched together and one or more of said pieces of fabric may be gathered, ruffled, shirred, or plaited, or otherwise operated upon for producing similar ornamental effects; to provide a machine wherein either knit goods can be manipulated; or, by the substitution of other devices, white goods or light leather or other stiff materials of similar character may be manipulated as desired; to provide a machine by which a ruffle may be formed from or placed upon a top band, or formed from or placed upon a bottom band, or formed from or placed upon both the top and bottom band and said ruffles stitched to said band; to provide means whereby, irrespective of the character of the ruffling, shirring or plaiting performed, the size or depth of the fold or the amount of material gathered may be regulated at the will of the operator; to provide means whereby, at the will of the operator, various kinds or character of work may be done in succession upon the same strip or strips of work without stopping, retarding, or otherwise affecting the stitching of the machine; to provide means, always accessibly presented to the operator, by which ruffling, gathering and shirring may be controlled and by which plain work and ruffling may be produced alternately and the ruffling varied according to desire, and at the will of the operator, without affecting the stitching operation of the machine, irrespective of the speed of the latter; to provide a machine wherein there is a top feed and a bottom feed, as auxiliaries to the ordinary feed of the machine which passes the work under the presser-foot, the said auxiliary feeding-devices to be interchangeable with ruffling-devices, either one or both, in order that two or more pieces of superposed work may be fulled or stretched, relatively, or that two or more pieces of work may be gathered, folded or plaited relatively and in varying degrees as to depth of fold or size of plaits; to provide means by which two or more pieces of fabric may be superposed and ruffled, gathered, or folded, and said folds or ruffles varied relatively, that is to say, one piece may be provided with deep folds, ruffles or plaits, and the other with shallow folds, ruffles or plaits, or the folds, ruffles or plaits in either or both pieces may be eliminated and plain stitching performed or, at the will of the operator, many variations in the size of the fold in either of the pieces may be produced while the machine is running at full speed and without affecting the stitching, the means for bringing about these various changes being always accessibly presented to the operator and completely under his control; to provide a compound four-motion auxiliary feed for operating upon the opposite sides of one or more pieces of fabric, and have the said compound auxiliary feeding-devices interchangeable with compound ruffling devices whereby to change the function of the machine and the character of the work to be performed by the latter; to provide an interchangeable feeding and ruffling machine wherein substantially the same movements are imparted to either auxiliary feed or the ruffling-blades, viz., in each instance, that is of the ruffling-blades or of the auxiliary feed or feeding-devices, each element shall have imparted to it four substantially distinct movements whereby, whether ruffling, plaiting or gathering is being performed by the ruffling-blades, or fulling, puckering, or stretching is being performed by the auxiliary feeds, each element of each of said mechanisms will have imparted to it a movement toward the work to engage the latter, a movement with the work to perform its function thereon, a movement away from the work to release the latter, and a movement back to the initial position preparatory to engaging the work again; to provide a machine wherein ruffling-devices may be substituted for an auxiliary clamp-feed, whereby the machine is capable of performing varied styles of work, such as ruffling, gathering and plaiting, or may produce certain essential operations upon goods which cannot be folded, ruffled or gathered by said ruffling-blades, but which may be fulled or stretched by feeding-devices which engage many wales of the material at the same time and crowd the same together for producing the collarette work which is performed on the well-known metropolitan collarette machine; to provide means, whereby varying thicknesses of work may be fed through the machine without detriment to the appearance of the work, involving a yielding member of the feeding mechanism which has its yielding movements relatively to and independent of the ordinary presser-foot of the machine and relatively to and independently of the other feeding-devices; to provide means whereby, irrespective of the position of the presser-foot, when it is desired to insert work in the machine to begin a given operation, the feeding mechanism will properly engage the work and carry the same forward to the stitching mechanism, that is to say, means are provided whereby, whether the presser-foot be raised or lowered, the material can be advanced to the proper position and will be engaged by the clamp-feed and advanced by the latter under the presser-foot and up to the stitching position evenly and with perfect uniformity, thus rendering it unnecessary for the operator to bother with lifting the presser-foot in order to insert the work in the machine, thus facilitating the management of the work and the operation of the machine, and relieving the operator of onerous details both in care of the machine and preparation of the work for a given stitching operation, hence saving an immense amount of time; to provide means whereby one of the feed-devices may yield relatively to the other both vertically and in the line of the feed whereby, should the two feed-devices become locked together by excessive pressure upon one or the other, or the stroke of one of the devices be greater than the other, said yielding device will be susceptible of control by the other device, thus overcoming any tendency to mar the functional surface of the two devices and preventing any possibility of injuring the work being operated upon; to provide means whereby, if it is desired to perform a given operation substantially constantly during the running of the machine and to change the character of such operation only momentarily, as, if it is desired to ruffle, gather or plait the material constantly with now and then a momentary intermission for plain work, the machine may be set for said operation whereby it can be performed with facility, and then variations in said operation made, as varying the degree of ruffling, gathering and plaiting, at the will of the operator while the machine is running at full speed and without affecting the stitching; to provide means whereby the mechanism, just referred to and set for the operations just described, may be shifted and set for a totally different class of work and operations, as where it is desired to sew straight ahead or plain work constantly with now and then a period of ruffling, gathering, plaiting or fulling and with variations in the character of the latter work; and, in combination with the mechanisms first noted, and set as just stated in the two previous instances of their functions, means whereby, after any change has been made in the normal work for which the mechanism has been set, a return to the latter will be automatically produced; and, in connection with the three functions last set forth and the interchangeability of the mechanisms referred to for performing the several functions, the provision of means whereby predetermined limits, to the movements of both the lower and upper work manipulating mechanisms for performing the said functions, may be obtained; to provide means whereby a single actuating eccentric or crank gives the feed movements to the main feed-dog as well as to the auxiliary dog and top feed-device, and to the ruffler blades when the latter are substituted for the feed-clamp; to provide means whereby, when the length of stitch is changed by changing the stroke of the main feed-dog, a proportionate change in the work of the auxiliary feeding-devices or feed-clamp, or in the stroke of the ruffling-devices when substituted for said feed-clamp, will take place, and, in combination therewith, to provide means whereby, after such change has been produced in the throw of the several devices just referred to, the stroke or throw of the auxiliary feed-devices or clamp, or of the ruffling-devices, may be changed according to desire so as to vary the same to any extent required or to reduce it to its normal operation as before the said change was made; to provide a ruffling-device whereby the ruffle-effects may be produced either by a single blade or by two blades, and, if a lower single blade is used, the ruffle will be formed in one direction and, if an upper single blade is used, a ruffle will be formed in the opposite direction, or, if both blades are used, the material will be clamped between the two and the fold positively made irrespective of the character of material being manipulated, thus enabling the ruffling-device to handle all kinds of materials, very light and thin, or very heavy and stiff; and to provide means whereby in operating upon any kind of material, ruffles, gathers and plaits may be formed in a single piece of material without a separator plate.

With the above objects in view, and others which will be hereinafter detailed, the invention consists in the parts, features and combinations of elements hereinafter described and claimed.

The accompanying drawings form part of this specification, and therein:

Figure 1 is a front elevation of a type of machine upon which I have chosen to illustrate my invention, the figure showing the cloth-plate in longitudinal section so as to disclose the mechanisms below said cloth-plate; Fig. 2 is a rear elevation of the machine; Fig. 3 is a front-end elevation of the machine; Fig. 4 is a section taken on the line 4—4 of Fig. 2 and looking in the direction of the arrow $x$ on said figure; Fig. 5 is a section taken on the line 4—4 of Fig. 2 and looking in the direction of the arrow $a$ in said figure; Fig. 6 is a top-plan view showing the machine-frame in dotted lines and the feeding mechanism in full lines, thus disclosing the coöperation and connection of the working parts; Fig. 7 is an elevation of a detail showing the top-feed lifting-device: Fig. 8 is a section on the line 20—20 of Fig. 7; Fig. 9 is a detail showing the presser-foot, the upper ruffling-device, the lower ruffling-device and main feed-dog, and the work-plate, on the line 9—9 of Fig. 10, looking in the direction of arrow $d$, the same being intended to illustrate the manner in which the oppositely-disposed ruffles may be formed; Fig. 10 is a front elevation of Fig. 9; Fig. 11 is a plan of a detail showing the main feed-dog and lower ruffling-device; Fig. 12 is a detail view similar to Fig. 9, intended to illustrate the manner in which the material or work is fulled in contradistinction to being ruffled; Fig. 13 is a side elevation of the lower blade and holder, looking in the direction of the arrow $y$, Fig. 10; Fig. 14 is a sectional view on the line 17—17 of Fig. 15, looking in the direction of the arrow on said figure; Fig. 15 is a section on the line 8—8 of Fig. 5, looking in the direction of arrow $g$; Fig. 16 is a section on the line 10—10 of Fig. 3, looking in the direction of the arrow on said figure; Fig. 17 is a section on the line 19—19 of Fig. 16, showing the manner in which the adjusting-screw is held in place, the sight being in the direction of arrow $f$; and Fig. 18 is a plan of one of the ruffler blades.

Primarily, it should be understood that the machine, constructed according to my invention, is capable of performing various functions, viz., the production of ruffling, gathering, shirring or plaiting, and the production of fulling and stretching. These several distinct functions are produced acordingly as the machine employs, or is provided with, feeding-devices properly timed and coöperating to produce the desired results, or employs, or is provided with a ruffler-blade, or ruffler-blades coöperating and, timed to produce the desired results. And, in this description, I desire it understood that the terms ruffling, gathering, shirring and plaiting are used to designate substantially the same class of work, as distinguished from both fulling and stretching; that is to say, ruffles, plaits, gathers and shirrs are produced by making material folds or crimps in the work and causing material portions of the work to overlap or lie upon other portions of the work, while fulling is produced by crowding the warp and weft threads, or the wales, of the goods together, without materially rippling or disturbing the surfaces of the work. Stretching, of course, is easily distinguishable from either of the general classes of work just above described. The various functions referred to are desirable in many different relations, ruffling, gathering, etc., being a commodity more in demand for backs of shirts, skirts, the tops of sleeves, trimmings and neck-pieces, and fulling being in demand for applying bindings to knit or elastic goods wherein the materials operated upon have more or less relative stretch and it becomes necessary to apply the binding quite smooth in order to be sightly. Stretching is often necessary in cases where it is found that the materials will not come out even, or where it is found that the feed-mechanism is crowding one piece of material too much upon another, which might result in unsightly or bulky work; in fact, both stretching and fulling, in operating upon knit or other elastic goods, may have to be produced in alternation, and at the will of the operator, in order to bring about the desired effects and secure the materials together in the proper manner. With the above in mind, coupled with the suggestion that the machine about to be described is capable of being controlled as to its several functions by the operator, and while the stitching is progressing at full speed without affecting said stitching, the following detailed description will be readily understood.

Referring to the drawings, the numeral 1 indicates the bed-plate of the machine, having the usual vertical standard 2, overhanging-arm 3 and head 4, in which latter the needle and presser-bars are supported and properly disposed relatively.

The numeral 5 indicates the driving-shaft, the outer end of which is provided with the combined hand-wheel and belt-pulley 6, and which is journaled at one end in the standard 2 and at its forward end in the bracket 7, said shaft being extended beyond the said bracket 7 for the purposes hereinafter described. The needle-bar is indicated by 8, presser-bar by 9, the latter carrying the presser-foot 10, which may be of ordinary or any special construction, and the needle-bar carrying the needle 11. The oscillating arm 12, of usual construction, is pivoted at 13 to the standard 2 and is actuated by the eccentric 14 on the driving-shaft through the medium of the usual eccentric-strap, not shown, but housed within the cover or oil-guard 15, said strap being connected at its upper end in usual manner to the rearwardly-extending arm 16 of the lever 12. The forward end of the lever 12 is connected by a link 17 and arm 18 with the needle-bar 8, the latter thus being reciprocated by said lever. The lower end 19 of the lever 12 is connected by pitman 20 to the looper-support 21, journaled at 22 to the adjustable bracket 23, said bracket being made adjustable transversely of the machine-bed by means of the clamping-screw 24 passing through an elongated slot in said bracket, said slot not being shown herein because forming no part of this invention. To the support 21 is pivoted at 25, see Fig. 5, the thread-carrying looper 26. This looper mechanism is only briefly described and is not shown in detail, because it forms no part of this invention, being made the subject of my application Serial No. 252,612, filed March 29, 1905.

Ordinarily, some sort of take-up and tension-device will be employed for controlling the looper-thread during the stitch formation, and the numeral 27, generally speaking, indicates such device, which is shown in some detail in Figs. 1, 2 and 4, but is not herein made the subject of specific description, because forming no part of this invention. Any usual form of tension-device, such as generally indicated by 28, is employed for operating upon the needle-thread; and 29 indicates the spring which coöperates with the presser-bar for depressing the same, the tension of said spring being controlled by means of the screw 30.

The forward end of the driving-shaft 5 is provided with the disk 31, provided with a diametric, angular, C-shaped slot 32, better shown in Figs. 3, 16 and 17, in which is set a sliding-block 33, provided with the forwardly-extending pin 34, having the smooth exterior, but screw-threaded at its outer end, as at 35. This construction practically provides the disk 31 with an adjustable crank-pin, by means of which the driving-power of the shaft is transmitted to the feeding mechanism. The sliding-block 33 is maintained in the slot 32 by the overlapping flanges in the face of the disk at the edge of the slot, indicated by 36, and said block is adjusted, together with the pin 34, transversely of the disk 31, by means of a swivel-screw, the head 37 of which bears upon the periphery of the disk, and a collar 37ª on which engages the walls at one end of the slot 32, and the shank 37ˣ of which passes through said block 33. Thus, the block 33 is rendered adjustable in the slot 32, by means of the screw, and said screw, in turn, is held in place on said disk by means of the block, this being a simple, compact and effective construction for the purpose. The crank-pin 34 carries a sleeve 38, one end of which bears against the face of the disk 31 and the other end of which is engaged by the washer 39, to which force is applied by means of the nut 40, screwed upon the end of the crank-pin 34, thus binding said sleeve against the face of the disk 31. This sleeve provides a wearing surface for the tubular end 41 of the pitman 42, which is journaled upon said sleeve 38 and has the reduced extension 43, constituting a bearing or journal for the tubular end 44 of the pitman 45, the said pitmen 42 and 45 extending in opposite directions and having the driving functions presently to be described.

By providing the construction just described, all wear is taken off the crank-pin 34 and the parts are caused to operate quietly and with comparatively little friction and no opposite torsion or strain upon the sleeve 38; that is to say, the sleeve 38 affords a journal and long bearing for the pitman 42, while the extended end 43 of the journal of said pitman 42 affords a bearing and journal for the pitman 45. Thus, the pitman 42 has a very long journal bearing upon the sleeve 38, while the pitman 45 has its bearing upon the journal of the pitman 42, thus relieving opposite strain at extreme points on the sleeve 38. This is an important feature of my feed-actuating mechanism and, upon it, I desire to lay stress. The pitman 45 extends toward the rear of the machine and is journaled to the upper end of the feed-rocker or rocking-frame 46, the lower end of which is adjustably clamped upon the rock-shaft 47, by means of the split-sleeves 48, arranged on opposite sides of the journal-bearing 49, in which the shaft 47 rocks. The rocking-frame is clamped to the shaft 47 by means of the screws 50. The numeral 51 indicates another bearing also connected with the bed-plate of the machine, in which the shaft 47 is journaled, and the upper end of the rocking-frame carries the shaft 52, which forms the connecting medium between the rocking-frame 46 and the pitman 45, the latter being secured to said shaft 52, in any suitable manner. The shaft 52 extends under the cloth-plate 53 of the machine, substantially parallel with the shaft 47. The shaft 52 has journaled upon it the rear end of the feed-bar 54, said rear end being embraced by the bearings 55 at the upper end of the rocking-frame 46. At its forward end, the feed-bar 54 is provided with the feed-dog 56, which is secured to said bar in any suitable manner. The feed-bar 54, at its forward end beyond the feed-dog 56, is arched so as to overstep the looper, and, beyond the latter is provided with the support 57, provided with the groove 58 in its back for the reception of the lateral extension 59 of the shank of the auxiliary feed-dog 60, which latter is arranged in advance of the path of reciprocation of the needle and on the left of the latter, while the main feed-dog 56 is arranged in rear of the path of reciprocation of the needle and on the right of the latter. The auxiliary dog 60 is caused to have sliding movement in the extension 57 of the feed-bar through the medium of the link 61, connected by means of the pin or screw 62, passing through the slot 63 in said extension 57 and tapped into the shank 59 of said auxiliary dog 60. The link 61 is pivotally connected at 64, Fig. 5, to the upper end of the curved lever 65, pivoted at its lower end at 66 to the bed-plate of the machine, or an extension thereof. The pitman 42 has pivotally connected to its outer end at 67 the shoe 68, so constructed as to embrace and freely slide upon the lever 65 under control of the operator and within certain limits, as presently described. The pitman 42 has secured to it, in any suitable manner, the post 69, to the upper end of which is connected the coiled-spring 70, the other end of which is secured to a bar 71 suitably connected to the pitman 45, this spring having the function of normally holding the pitman 42 in the position shown in Fig. 3, with its shoe in contact with the stop 72, which is adjustably secured by means of the sleeve 73 and screw 74 to the upper end of the stop-post 75, set in the bracket 76, secured to the bed-plate of the machine by means of the screws 77, said bracket 76, as shown in my present construction, also affording the pivotal support for the curved lever 65. The stop-post 75 also carries a second stop 78, secured thereto by means of sleeve 79 and screw 80, the said stops 72 and 78 being thus capable of adjustment upon the stop-post, in order to regulate the distance to which the pitman 42 may be moved vertically in sliding its shoe 68 along the curved lever 65, the lowermost position of said pitman 42 being represented by dotted lines in Fig. 3, to which position said pitman may be forced by the operator in opposition to the spring 70, through the medium of the connection 81, which may be a rod or chain, which is connected, for example, to a lever 81ª in turn connected to either a knee-shift or treadle by means of a chain 81ˣ, said shift or treadle being accessibly presented to the operator so as to be always under the control of the latter. As just described, it will be observed that the normal position of the pitman 42 will be that shown by the solid lines in Fig. 3, said pitman being thus normally held by the spring 70; but, by a reversal of the position of the post 69 and the elongation of bar 71, as shown by dotted lines in Fig. 3, the spring 70 may be disposed below the driving-shaft 5, and connected at 82 to said bar, so as to cause the pitman 42 to be normally held in the dotted-line position shown in Fig. 3, as will be readily understood. If the dotted-line position be the normal adjustment of the mechanism, the rod 81 will be so connected to the treadle or knee-shift as to force the pitman 42, in opposition to the spring 70, into the solid-line position of Fig. 3. Thus, it will be apparent that, normally, either the maximum or the minimum throw of the lever 65 may be produced in order to drive the auxiliary feed-dog 60, and any intermediate extent of throw may be produced, as either the maximum or minimum, according to the adjustment of the stops 72 and 78. And, whatever may be the maximum or the minimum, any variation of either of them may be instantly produced by the operator through the medium of the rod 81, etc., connected to the pitman as before described.

From the above description, it will be seen that all the horizontal movements imparted to the main and auxiliary feed-dogs are transmitted from the single crank-pin, which may be adjusted relatively to the axis of the driving-shaft 5, transversely of the disk 31, in order to produce the requisite amount of movement in the primary feed-bar and its dog, which movement will also constitute the basis for the movement of the auxiliary feed-dog, the movements of which latter may be varied, according to the will of the operator, by moving the shoe 68 along the lever 65, as just described.

The parallel shafts 47 and 52 have secured to their inner opposed ends a bracket or frame 83, which is extended into the upwardly-projecting arm 84, provided with an elongated slot 85, in which operates a pin 86 carried by the lower end of a link 87, journaled at its upper end on screw 88 tapped into extension 89 of a bearing or bracket 90, in which one end of the rock-shaft 91 is journaled, the other end of said rock-shaft being journaled in a bearing 92 near the head of the machine. The rock-shaft 91 carries the curved or segmental arm 93, upon which slides a shoe 94, pivoted by the screw 95 to the end of a lever 96, pivoted at 97, substantially midway of its length, to the link 87, the outer end of said lever 96 being provided with an aperture 98, for the reception of a chain, rod or other device 99, shown in Fig. 3, which connects, in any suitable manner, and it may be through the intermediary of the lever 81ª, with either a knee-shift or treadle, whereby the operator can, at will, and without affecting the stitching mechanism of the machine in any particular, slide the shoe 94 along the segmental arm 93, in order to control, regulate and adjust the throw of the said arm 93 and, consequently, the rocking movement of the shaft 91, for purposes presently to be described. In order to maintain a normal position of the lever 96 and its shoe 94, a spring 100 is connected to the outer end of the lever 96, and also to the hooked extension 101 of the link 87. The contraction of the spring 100 will draw the lever to, and tend to maintain it in, the full-line position shown in Fig. 4, thus normally holding its shoe 94 against the stop-pin or screw 102 at the lower end of the segmental arm 93. The arm 93 is provided with a number of apertures 103, extending along its length, into which the stop-pin 102 and a stop-pin or screw 104 may be adjusted, in order to set a limit to the movement of the shoe 94 upon the arm 93, to thus control the extent to which said shoe may be moved by the operator upon the arm 93. Obviously, the operator can gradually slide the shoe along the arm 93, in order to gradually decrease or increase the movement of said arm and the rock-shaft 91, or he can shift the shoe 94 quickly from one stop 102 to the other stop 104, in order to obtain instantly a change from one extreme to the other in the rocking movement of the arm 93 and the rock-shaft 91. Hence, the operator has the movement of the rock-shaft completely under his control at all times during the running of the machine and said movement may be changed and varied at will, without affecting the stitching of the machine. The forward end of the rock-shaft 91 has applied thereto, through the medium of an elongated sleeve 105, a rock-arm 106, the screws 107 passing through the sleeve 105 and being tapped into or spotted upon the shaft 91, in order to obtain a rigid connection. The rock-arm 106 is pivotally connected at its lower end to one end of a link 108, the connection being formed by means of the screw 109, passed through the tubular end 110 of the arm 106, and tapped into the end of said link 108. The other end of the link 108 is pivotally connected to the lower end of the top feed-lever 111, the connection being formed by means of the screw 112, the smooth body 113 of which is embraced by the end of said link 108, the threaded end 114 of said screw being tapped into the lower end of the top feed-lever 111. See Fig. 15. The upper end of said feed-lever 111 is pivotally connected to an extension or bracket 115, made a part of, or secured to, the head of the machine, the connection being formed by means of the screw 116, the smooth body 117 of which journals into bracket 115, and the screw-threaded end 118 of which is tapped into the upper end of the top feed-lever 111. The feed-lever 111 is formed with a slide-way 119, see Figs. 5, 14 and 15, in which the top feed-dog slide 120 operates, said slide having at its lower end the top feed-foot or dog 121 journaled thereto by means of the flanged-screw 122, the smooth body 123 of which affords the journal upon which the said foot can freely swing or rock. The screw-threaded end 124 of the screw 122 is tapped into the slide 120. The feed-foot 121 is on its functional surface provided with serrations 125, which may be formed in a double row to provide teeth by means of which said foot may engage the work and coöperate with the auxiliary feed-dog 60 in feeding the work up to the stitching mechanism. At its upper end, the feed-foot 121 is provided with an extension 126, in the top of which is formed an aperture for the reception of the lower end of a spring-bar 127, the upper end of which is formed into an eye or head 128 sufficiently broad or large to engage the sidewalls of a slot 129 in the face of the feed-lever 111.

It will thus be seen, that the slide 120 is embraced by the walls of the slide-way 119 and the walls of the slot 129, thus preventing lateral displacement of the slide 120, while the head 128 of the spring 127 operates within the slot 129 and said spring being so bent, as shown in Figs. 14 and 15, that its inherent spring will normally tend to hold its head in the slot 129 and with some friction against the slide 120. Thus, the spring 127 holds the feed-foot 121 normally in a vertical position, but flexes laterally to permit the said feed-foot to automatically adjust itself, in the direction of the length of its feeding surface, to the surface of the work upon which it is operating, so as to properly coöperate with the opposed feed-dog 60 and also so as to yield or accommodate itself to varying thicknesses of the work upon which it is operating. Moreover, the connection of the said foot 121 to the feed-lever 111, through the medium of its slide 120, is such as to permit the said foot to yield longitudinally of, or vertically relatively to, the feed-lever 111 during the operation of the machine, as well as to be bodily lifted or moved longitudinally of the feed-lever 111, by pin 133ª, projecting from presser-bar 9, coöperating with the spring 130, see Figs. 3 and 5, one end of which is provided with an elongated loop 131, the bars of which embrace an extension 132 of the screw 122. The spring 130 is extended transversely of the machine to a point at the back of the head 4, and behind the presser-bar 9, where it is formed into a large loop 133 and has its end 134 prolonged and extended upwardly, see Figs. 2 and 5, and then formed into an elongated loop 135, through which loop a clamping-screw 136 is passed, and tapped into either the back of the head of the machine or, preferably, into a bracket or extension 137, see Figs. 7 and 8, secured to, or formed on, the head of the machine. The bracket 137 depends from the head to a position behind the presser-bar and its lower end is formed into a journal-bearing 138, for the support of the journal 139 of a rocking-lever, one arm 140 of which is formed into a cam which engages the upper portion 141 of the loop 133, thus exercising its power upon the spring 130 to move the feed-foot 121 longitudinally relatively to the feed-lever 111, the said cam 140 being operated by the arm 142 of the rock-lever, the outer end of which arm is provided with an elongated slot 143, into which extends the head of a screw 144, tapped into the needle-bar 8. Thus, it will be seen that the reciprocation of the needle-bar operating through the medium of the screw 144 and the rock-lever 142—140 will impart vibratory movement to the spring 130, which in turn will, in the instance shown, raise and lower the top feed-foot 121, so as to engage and release the work periodically and in conformity with the movements of the needle-bar. Alternately, with these movements the said feed-foot 121 will be given its feeding or to and fro motion through the medium of its connection with the feed-lever 111, actuated by the link 108, rock-arm 106, rock-shaft 91, segmental-arm 93, lever 96 and connections back to the crank-pin 34 on the driving-shaft, through the medium of the feed-rocker 46 and connecting mechanism.

In other words, the crank-pin and parts driven thereby are so timed relatively to the rocking-lever 140—142 and the parts actuated thereby, that the top feed-foot 121 has imparted to it four motions, viz., a movement into engagement with the work, a movement in a direction substantially at a right-angle to the latter movement in order to feed the work, a movement to release the work, and a retrograde movement to recover its feed stroke. These movements are given to the feed-foot so that, when the needle has passed through the work into coöperation with the looper, the cam-arm 140 will lift the feed-foot 121 from the work and said foot will be retrograded to its proper position to descend upon the work for a feeding movement. As the needle rises, the foot will descend upon the work preparatory to feeding the same, and, as the needle leaves the work, the feeding-foot will be moved so as to feed the work up to the stitching position under the presser-foot. These movements, generally speaking, are the same as those of the main feed-dog 56 and the auxiliary feed-dog 60; that is to say, both said dogs being out of engagement with the work when the needle is in the latter and both said dogs engaging the work as the needle passes from the latter, and as the needle leaves the work, both the main and auxiliary dogs will begin their feeding strokes. These feeding strokes, however, of the main and auxiliary dogs, and of the top feed-foot will be timed in accordance with the character of work to be performed, the main dog being given the stroke desired for passing the work through the machine from the stitching position, while the auxiliary dog is given a movement under control of the operator, which is desirable for the particular purpose, in order to operate upon the work in advance of the needle and, at the same time, the top feed-foot is actuated under control of the operator, to perform its particular function upon the work, either in unison with the auxiliary dog with which it coöperates, or to have an individual action for a specific purpose, as when it is desired to perform a special function upon the top piece of work with which said foot specially coöperates.

Thus, it will be seen that the main feed-dog can be caused to feed the work through the machine in the desired manner and at the desired speed, according to the number of stitches to the inch required, while the auxiliary dog and the top feed-foot can be caused to perform special operations upon the work in advance of the stitching position, in order to secure the results desired, these special operations and the particular movements of the auxiliary dog and of the top feed-foot being always under control of the operator and capable of being varied during the running of the machine, and at the will of the operator, without affecting the stitching, or in any manner disturbing the normal function of the stitch-forming mechanism.

I have described the cam-lever 140—142 as though it were a single, integral device with a journal in the bracket 137, and which, obviously, it may be if desired; but, I preferably construct this mechanism as shown in Figs. 7 and 8, wherein the journal-pin 139 is provided with a reduced, prolate or flat-sided extension 139$^x$, which is received in a conforming but slightly longer slot 142$^a$ of the lever-arm 142, said arm being held from lateral movement on said extension 139$^x$ by means of the screw 139$^a$ properly tapped into the journal-pin 139. On the opposite side of the bearing 138, the journal-pin 139 is reduced and extended as at 139$^c$ for receiving the cam-arm 140, which is secured to said extension by means of the screw 139$^b$ passing through said cam and engaging with or spotted upon the said extension 139$^c$. Thus, the cam 140 can be adjusted so as to lift the spring 130 more or less and proportionally lift the top feed-foot, and the arm 142 can drive said cam positively without depending upon a pin or screw connection with the journal 139.

For the sake of simplicity, and in order to illustrate one form of my invention, or, rather, one branch or set of functions of my machine, I have shown in the drawings an auxiliary feed-dog 60 and a top feed-foot 121; but, from the mechanism already disclosed, it will be apparent, to anyone skilled in the art, that, in place of the auxiliary dog 60, I may secure a lower ruffler-blade 145, and that, in place of the top feed-foot 121, I may secure an upper ruffler-blade 146, see Figs. 9, 10, 11 and 13, thus enabling me to ruffle two independent pieces of work, such as $w$ and $w'$, the folds of which, though extending in the same general direction, will be formed substantially opposite to each other, and these two pieces of ruffling may be secured to an intermediate band or piece of material $w^2$. In order to lead in the pieces of work, the presser-foot 10 may be provided at its forward end with a substantially S-shaped guide 147, through the top space 147$^a$ of which the top piece of work or strip $w$ may run, and with a slot 148, through which said strip may be passed under the presser-foot, and also through which the top ruffler-blade 146 may operate so as to engage said strip. The work $w^2$ is led in through the space 148$^a$ of the guide, the bottom of which space is carried forward as at 148$^x$ to provide a portion for coöperation with the opposite ruffler-blades in advance of the stitching position. If desired, tension may be applied to work $w^2$ by means of a spring $w^3$ engaging one side and a tongue $w^4$ engaging the other side of said work, the tongue being formed in extension of the guide 147 and the spring being suitably secured to the latter or the presser-foot. The manner in which the machine may be caused to produce ruffling on either one or both of two pieces of fabric and the manner in which said ruffling may be secured together, or to the opposite sides of an intermediate piece of work, is shown in Fig. 9. When the ruffler-blades are substituted for the feeding-devices, as suggested, no change is made in the actuating mechanism, but the blade-carriers are of a form modified to properly hold the blades in position for coöperation as described; that is to say, in place of the top feed-foot 121, a blade-carrier 150 is employed, the same being secured in place by a slightly modified screw 122$^x$, said carrier being provided with a grooved extension 151, see Fig. 9, projecting at an angle to its body-portion and having the blade 146 clamped in said groove by means of the grooved plate 152 and clamping-screw 153, the blade being thus held from lateral movement in its carrier and at the proper angle to work through the slot 148 in the presser-foot. The lower blade-carrier is formed with a T-shaped head 154, see Figs. 10 and 13, to slide in the groove 58 of the feed-bar extension 57, and with a blade-holding portion 155, arranged diagonally across said head 154, provided with a groove 156 in which said blade is set and therein held by a clamping-plate 157 and screws 158, said blade being thus held at the proper angle to work through the feed-slot in the work or throat-plate, the form of which latter may or may not have to be changed.

The ruffler-blades 145 and 146 are substantially the same in form, one of which is shown in Fig. 18, wherein the shank may be or is provided with an elongated slot 159, allowing for adjustment, with a forward serrated edge 160, in which is formed the needle-receiving slot 161. In Fig. 12, I have illustrated the manner in which the work may be fulled by the auxiliary dog and top feed-foot, in order to produce the results and effects heretofore referred to; but, it must be understood that the work in Fig. 12 has been exaggerated, in order to convey an idea of the operation of fulling. In this figure, the two pieces of work which are fed along together are represented by $o$ and $o'$ and the figure illustrates the manner in which the auxiliary feed-dog and the top feed-foot crowd the warp and weft, or wales of the work, according to the character of the latter, without making a distinct fold; that is to say, when fulling is to be performed, the auxiliary dog and top feed-foot will be given movements in unison, which movements will be faster than the feeding movement of the main feed-dog, in order to crowd the work up to the stitching position, the general effect of the top feed-foot and the auxiliary dog being illustrated by exaggeration to show how the material will be crowded by the said feed-foot and auxiliary dog toward the main feed-dog and bowed in advance of the latter, as indicated at $o^2$. When the stitches are formed, however, this bow $o^2$ in the work will be obliterated and it will be found that the warp and weft threads, or the wales of the work have been merely crowded together or condensed without any ripple or convolution in either surface of the work. These two figures show clearly the difference between the two functions of the machine, viz., that of ruffling, gathering, plaiting or shirring, and that of fulling. Obviously, if the auxiliary feed-dog and the top feed-foot are given a movement even slightly less extensive or slower than the movement of the main feed-dog, the former will stretch the work by creating a substantial drag thereon in opposition to the action of the main feed-dog in passing the work from the stitching position after the stitching has been performed. Thus, it will be seen that the possibilities in my machine are very great, in the matter of the character of the work capable of being performed thereby, because, in addition to ruffling, etc., fulling and stretching, the several feed-devices may be so timed relatively that several pieces of work superposed and passed under the presser-foot to the stitching position can be fed with absolute uniformity and without the relative movement of one piece of the work upon the other or others, thus making the machine valuable in connection with stiff or smooth work, such as canvas, buckram, leather, etc., all of which, when two or more pieces are sewed together, have a tendency to creep one upon the other and thus strain the stitch and stretch the threads of the latter between the several layers, and causing them, subsequently, to work or move relatively, producing defective work and an insecure junction.

During the course of this description, many advantages have been pointed out in connection with details of construction and special mechanisms; but, in addition, a short statement or review of the principal advantages of the machine will not be amiss; by the use of the auxiliary dog and top feed-foot, knit goods can be operated upon and perfectly controlled during the stitching, so as to prevent abnormal stretching, and so as to produce a requisite amount of fulling for a given piece of work; the machine can be adapted, by the application of a single attachment, such as folder, or other form of binder, to supply a more or less elastic strip of knit goods to a body garment, such as an undershirt, without wrinkling or stretching, and said strip may be applied to a curved edge of the body-material, as the neck-opening of an undershirt, with absolute accuracy and with perfect results, inasmuch as, by giving to the top feed-foot and the auxiliary dog a faster movement than the main feed-dog, a rounding of the binding-material will be produced so as to give to the binding a curved form and maintain the natural curvature of the neck-opening of the garment; by combining the top feed-foot and the auxiliary dog, and giving to them a relatively faster movement than the main feed-dog, the top and bottom hemmed edges of a folded binding may be smoothly applied to a curved edge of the body-material, because the said auxiliary dog and feed-foot will normally tend, to a greater or less extent according to the rapidity of their movements, or the extent of their movements relatively to the main feed-dog, to impart a curved form to the finished work, this being due to the fact that, as shown in Figs. 1, 2 and 3, the said auxiliary dog and top feed-foot operate at a substantial distance from the main feed-dog, thus enabling them to engage and operate upon the extreme edges of the binding-material, which edges, in the finished article, will represent the greatest radius of the curve of the finished product; by disposing the top feed-foot and the auxiliary feed-dog in advance of the stitching position and partially in advance of the presser-foot, and by operating the top feed-foot as described, so as to raise the same from the work, the position of the presser-foot becomes unimportant, that is, it is immaterial whether the presser-foot be raised from, or lowered upon, the cloth-plate, inasmuch as it will always be possible to insert the work in the machine for a given operation whenever it is desired, and whether the presser-foot be raised or lowered, because the work can always be advanced to the toe of the presser-foot, thus bringing the same between the top feed-foot and the auxiliary dog, so that the instant the stitching begins the said two feeding-devices will engage and feed the work forward properly under the presser-foot and up to the stitching position, thus rendering it unnecessary for the operator to bother about the presser-foot, and thus facilitating the management of the work and the operation of the machine and relieving the operator from the details and care of preparing the work for a given stitching operation, resulting in an immense saving of time; all the fulling, stretching and ruffling functions are absolutely under the control of the operator through the medium of the knee-shift or treadle and the intermediate connections, so that, during the running of the machine, variations of the said functions may be produced without affecting the stitching, the character of the work, therefore, being under the control of the operator who, at his will, can vary and change the operation of the ruffling-devices, or the top feed-foot and auxiliary dog through the medium of the knee-shift or treadle, which are always accessibly presented to him, and are thus easily operated by either the knee or foot, so as to leave his hands entirely free for such control and manipulation of the work above the cloth-plate, as may be necessary during the running of the machine; the entire mechanism, for operating the top feed-foot, the auxiliary dog and the main feed-bar, is driven from a single actuating device carried by the driving-shaft of the machine, this device thus becoming the prime mover and having direct connection with the three sets of mechanism, viz., the main feed-mechanism, the auxiliary feed-mechanism and the top feed-mechanism; the action of the main feed-mechanism may be regulated to vary the stroke of the main feed-dog and while the machine is at rest, through the medium of the adjusting-screw 37, but the auxiliary feed-mechanism and the top feed-mechanism, as well as the ruffling-mechanism when substituted, may be varied during the running of the machine and without affecting the main feed-mechanism, or the stitch-forming mechanism, at the will of the operator, as previously set forth; the driving-mechanism for the several devices described, viz., the top feed-foot and the auxiliary feed-dog, though being directly connected with the main feed-dog driving-mechanism, has included among its operating devices two controlling means, one for the auxiliary dog, and the other for the top feed-foot, which can be manipulated during the running of the machine, and at the will of the operator, for changing and modifying the effect of the main feed-actuating mechanism, this being an important feature of the invention upon which stress is laid, because elements of the main driving-mechanism are utilized, resulting in simplifying the machine and reducing the number of parts, notwithstanding the many variant functions of the machine; the disposition of the parts is such as to avoid any obstruction to the work in passing through the machine, thus giving a large, open and free space under the arm 3 of the machine for disposing of the large bulk of work upon which a given operation has to be performed; and, notwithstanding the many variant functions of the machine, the machine is simple, contains comparatively few parts, is comparatively light and easy running and, consequently, is cheap to manufacture, and, in addition, is quite simple to operate and requires very little care or attention on the part of the operator and enables the latter to have his hands absolutely free to take care of any bulk of work upon which he may be operating.

Having thus described my invention, what I claim and desire to secure by Letters Patent is:

1. The combined ruffling and feeding mechanism having, in combination, means for feeding the work including a single feed-bar carrying a dog, said bar having a grooved extension in front of said dog, a carrier operating in the groove of said extension, a driving shaft having a rotary device fixed thereto for actuating the bar and carrier, and independent connections extending from said rotary device one set to said bar and the other set to said carrier for transmitting the motion of the rotary device and converting said motion into longitudinal reciprocation in the bar and carrier.

2. The combined ruffling and feeding mechanism having, in combination, a feed-bar carrying a feed-dog, a presser-foot opposed to and coöperating with said dog to feed the work, a carrier arranged in front of the feed-dog and having means for manipulating the work, a second carrier opposed to the first-named carrier and operating in front of the presser-foot, said second carrier having means for manipulating the work in coöperating with the means of the first carrier, and means for controlling the action of one or more of said elements at the will of the operator during the running of the machine.

3. In combination, a feeding mechanism comprising a main feed-dog and an independent auxiliary feed-dog, a feeding foot coöperating with the auxiliary dog, and means whereby each of said feeding devices may be given feed movements.

4. In combination, a feeding mechanism comprising a main and an auxiliary dog one arranged in advance of the other, a feeding foot for coöperating with the auxiliary dog, means for actuating the said dogs and foot and means for throwing one of said feeding-devices into and out of operation at the will of the operator without affecting the operation of the other feeding-devices.

5. In combination, a feeding mechanism comprising a main feed-dog and an independent auxiliary feed-dog, one arranged in advance of the other, in the line of feed, and a feeding-foot coöperating with one of the dogs, and means for adjusting the throw of one of the feeding-devices while the machine is in operation.

6. A feeding mechanism having, in combination, a main and an auxiliary feed-device, means for actuating said devices differentially, a feeding-foot coöperating with the auxiliary feed-device, and means for controlling the action of one or more of the feeding-devices during the operation of the machine.

7. A feeding mechanism having, in combination, a main feed-dog and an independent auxiliary feed-dog, a feeding-foot coöperating with one of said dogs, and means for regulating the stroke of the feeding-foot and the auxiliary dog while the machine is in operation.

8. A feeding mechanism having, in combination, a lower feeding mechanism, and a top feeding mechanism including a pivotally supported feeding device, and means whereby the action of the top feeding mechanism is rendered yielding in all its movements including two springs arranged substantially at a right angle to each other, whereby to compensate for obstructions.

9. In combination, a main feeding mechanism, an independent clamp-feeding mechanism having movements relatively to the main feeding mechanism; and means whereby one member of the clamp-feed is rendered yielding relatively to the other, whereby to avoid excess of pressure of the clamp-feeding mechanism upon the work.

10. In combination, a main feeding mechanism and a clamp-feeding mechanism independent of each other, and means whereby, during the operation of the machine, the clamp-feeding mechanism may be regulated in its stroke relatively to the main feeding mechanism.

11. In combination, a main feeding mechanism and a clamp-feeding mechanism, and means whereby, during the operation of the machine, one or both of the elements of the clamp-feed may be regulated relatively to the main feeding mechanism.

12. In combination, a main feeding mechanism, an auxiliary feed-dog, an independent auxiliary mechanism for actuating said auxiliary feed-dog, and means for holding said feed-dog, said means being adapted for holding a ruffling device, whereby said auxiliary mechanism may be converted into a ruffler actuating mechanism.

13. In combination, a main feeding mechanism, an auxiliary feed-dog, an auxiliary mechanism for actuating said auxiliary feed-dog, means for regulating the stroke of the auxiliary mechanism during its operation, and means whereby the auxiliary mechanism may be converted into a ruffler actuating mechanism.

14. In combination, a driving-shaft, a main feeding mechanism, means for actuating the main feeding mechanism from said driving-shaft, a stitch-forming mechanism including a reciprocating needle-bar, an auxiliary feeding mechanism including a vibratory lever, a slide mounted thereon, a feeding device pivotally supported on said slide, and means whereby said latter device may be actuated from said bar.

15. In combination, a main feeding mechanism, a driving-shaft, means connecting the main feeding mechanism with the driving-shaft whereby said mechanism is actuated, an auxiliary feeding-mechanism, a reciprocating bar, and means whereby the auxiliary mechanism is actuated from said bar including a rocking cam and an elastic connection.

16. A feeding mechanism having, in combination, a feed bar carrying a feeding device, an auxiliary feeding device arranged in front of the other feeding device, a driving-shaft, a crank carried by said driving-shaft, means for adjusting said crank relatively to the driving-shaft, and a connection between the said crank and said feed-bar including a sleeve surrounding the crank, a pitman coupled with the bar and having its end surrounding the sleeve, and a second pitman connected to the auxiliary feeding device and also surrounding said sleeve.

17. A feeding mechanism having, in combination, a driving-shaft, a crank thereon, a feed-bar carrying a main and an auxiliary dog, means for actuating said dogs including two independent pitmen connected, respectively, to said dogs, and means connecting said pitmen to the said crank.

18. A feeding mechanism having, in combination, a driving-shaft, a crank carried thereby, a sleeve surrounding the crank, a pitman having its end surrounding the sleeve, a second pitman having its end surrounding the sleeve, and the said end of the other pitman, feeding-devices, and means connecting the said pitmen to said feeding-devices.

19. In combination, a feeding mechanism comprising a feed-bar carrying a feeding device, and driving mechanism for said feed-bar comprising a driving-shaft, a disk carried thereby, a crank-pin carried by the disk, means for adjusting the crank-pin radially of said disk, a sleeve carried by said crank-pin, means for clamping said sleeve in position upon the pin and against the face of the disk, a strap one end of which surrounds said sleeve, a lever connected to said feed-bar, a shoe sliding upon said lever, and means connecting the other end of said strap with said shoe.

20. A feeding mechanism having, in combination, a feed-bar carrying a main and an auxiliary feed-dog, means for actuating the bar, means for actuating the auxiliary dog independently of said bar, and means whereby the adjustment of said auxiliary dog may be regulated within two extremes and either of said extremes of adjustment instantly secured during the running of the machine at the will of the operator.

21. A feeding mechanism having, in combination, a feed-bar having a feed dog fixed thereto, means for imparting to said bar vertical and horizontal movements, a second feed-dog slidingly carried by said bar, means for imparting to said second feed-dog reciprocating movements substantially in the direction of the length of the bar, and means for regulating the movements of said second dog during the running of the machine.

22. A feeding mechanism having, in combination, a feed-bar having a feed dog fixed thereto, means for reciprocating the same vertically and horizontally, a second feed-dog carried by said bar, means for reciprocating said second feed-dog substantially in the direction of the length of the bar, said means including a vibratory lever, a connection therefrom to said dog, and means for variably vibrating said lever during the running of the machine.

23. A feeding mechanism having, in combination, a feed-bar, a dog carried thereby, means for reciprocating said dog on the bar, including a vibratory lever carrying a sliding-shoe at all times free to move on said lever, and a duplex stop for limiting the movements of said shoe in opposite directions, and means whereby the shoe may be moved on the lever during the operation of the machine.

24. A feeding mechanism having, in combination, a feed-bar, a dog carried thereby, means for vertically reciprocating said bar, means for reciprocating the dog on the bar longitudinally thereof, and means for regulating the extent of reciprocation of said dog during the operation of the machine and at the will of the operator.

25. A feeding mechanism having, in combination, a feed-lever, a slide under spring control movable on said lever, a feed-foot under spring control pivotally carried by said slide, means for actuating the lever, and means for reciprocating the slide on said lever.

26. A feeding mechanism having, in combination, a feed-lever, means for actuating the same, a slide movable on said lever, a foot carried by said slide, and means for moving the foot relatively to the lever including a spring-support for the foot, a cam coöperating with said support, and means for actuating the cam.

27. A feeding mechanism having, in combination, a feed-lever, a slide under spring control carried by said lever, a foot under spring control journaled on the slide, means whereby said foot may rock relatively to both the slide and the lever, and means for reciprocating said slide on said lever.

28. A feeding mechanism having, in combination, a lever, means for actuating the same, a foot under spring control carried by the lever, means whereby the lever may actuate the foot, means whereby the foot may rock independently of the lever, and means whereby the foot may be reciprocated longitudinally and independently of the lever.

29. A feeding mechanism having, in combination, a feed-lever, means for actuating the same, a foot pivotally carried by the lever, a reciprocating bar, a vibratory cam, means connecting said cam and bar whereby the former is actuated, and means connecting the cam with the foot whereby the latter is actuated on the lever.

30. A feeding mechanism comprising main feed mechanism, a clamp-feed, a driving-shaft, and means for actuating the main feed mechanism and the two members of the clamp-feed from the driving-shaft, said means including a device whereby both members of the clamp-feed may be regulated during the operation of the mechanism at the will of the operator.

31. A feeding mechanism comprising a feed-carrying member, means for actuating said member including a two-armed lever, the journal of which is supported in the frame of the machine, and one of said arms being provided with a cam and a yielding connection between said cam and said member.

32. A feeding mechanism having, in combination, a feed-bar, a rocking frame upon which said bar is journaled, means for actuating the frame, a feeding-device carried by said bar, and auxiliary feed-device carried by said bar, a top feed-foot coöperating with said auxiliary feed-device, and means for actuating said top feed-foot connected to the latter and to the rocking-frame including means for varying the movement of said feed-foot.

33. A feeding mechanism having, in combination, a main feed, and an auxiliary feed coöperating therewith to feed the work through the machine, actuating mechanism for the auxiliary feed, an adjustable stop mechanism coöperating with the auxiliary feed-actuating mechanism, and a connection for a knee-shift coöperating with the said auxiliary feed-actuating mechanism.

34. In combination, a stitch-forming mechanism, a presser-foot, a feeding-mechanism, the latter comprising a main feed-device and a coöperating feed-foot, and means for actuating said feed-device and feed-foot including means whereby, irrespective of the position of the presser-foot, the work may be advanced to and fed under the latter.

35. A feeding mechanism comprising the main and auxiliary feed-dogs, a bar carrying said dogs, means for actuating said dogs including a rocking-frame, a rocking-lever, a driving-shaft, a crank-pin carried thereby, two pitmen carried by said crank-pin and connected, respectively, to the rocking-frame and the rocking-lever.

36. A feeding mechanism having, in combination, a feed-bar, a dog carried thereby, means for actuating the dog relatively to the bar, including a driving-shaft, a pin carried thereby, a pitman connected to the said pin on the driving-shaft, a rocking-lever, a connection between the pitman and said lever at all times free to slide upon the latter, means for normally holding said pitman in an extreme position relatively to said lever, and means whereby said connection may be shifted at will during the operation of the machine.

37. A feeding mechanism having, in combination, two feeding devices which operate upon opposite sides of the work and coöperate to advance the work through the machine, means for actuating said feeding-devices, and means whereby one of said devices may control the operation of the other device.

38. In combination with stitch-forming mechanism and feeding mechanism having two coöperating four-motion feeding-devices, means for operating the same including means for separating said devices at the end of a feeding operation, and a presser-foot mechanism, the feeding-devices being arranged substantially in front of the presser-foot mechanism and entirely in front of the stitch-forming mechanism, whereby the work may be fed under the pressure-foot and up to the stitch-forming mechanism at the beginning of an operation without the necessity for primarily lifting said foot.

39. A feeding mechanism having, in combination, a feed-bar carrying a feed-device, an auxiliary feed-device carried by said bar, means for actuating said bar, means for varying the action of said auxiliary feed-device during the operation of the mechanism, and means whereby, after such variations in the movement of the auxiliary feed-device have been made as desired, the auxiliary feed-device may be caused to resume automatically its normal working action.

40. A feeding mechanism having, in combination, a main feed-dog, an independent auxiliary feed-dog, and a top feed-device, an actuating crank, and means between said crank and each of said feeding-devices whereby the latter may be actuated.

41. A feeding mechanism having, in combination, a feed-dog and a feeding-foot, means for actuating the two said feeding-devices, means for regulating the stroke of the feed-dog, means for regulating the stroke of the feeding-foot and means connecting the two regulating means so that regulation of the stroke of the dog results in proportionately regulating the stroke of the feed-foot.

42. A feeding mechanism having, in combination, a feed-dog and an independent clamp-feed, means for actuating the two said feeding-devices, and means for regulating the movement of the said dog and proportionately regulating the movement of the feed-clamp.

43. A feeding mechanism having, in combination, a main feeding-device and an auxiliary feeding-device, means for actuating the two said devices, means for regulating the stroke of the main feed-device and proportionately regulating the stroke of the auxiliary feeding-device, and means whereby, irrespective of the regulation just stated, the throw or stroke of the auxiliary feed-device may be changed at the will of the operator during the operation of the mechanism.

44. In combination, a stitch-forming mechanism the needle-bar of which is provided with a lateral projection, a feeding-device, means for giving the feed movements to the latter including a connection with the projection of the needle-bar, and a cam-device, a yielding connection therefrom to elements of the feeding mechanism whereby when the needle-bar is lifted, the feeding-device will be in yielding operative contact with the work ready for its feeding movements.

In testimony whereof, I have signed my name to this specification in the presence of two subscribing witnesses, this twenty-sixth day of July, 1906.

JOHN P. WEIS.

Witnesses:
WM. E. LIETNER,
W. J. REED.